June 8, 1937.  F. D. FRISBY  2,082,826
CHASSIS FOR POWER OPERATED VEHICLES
Filed May 8, 1936
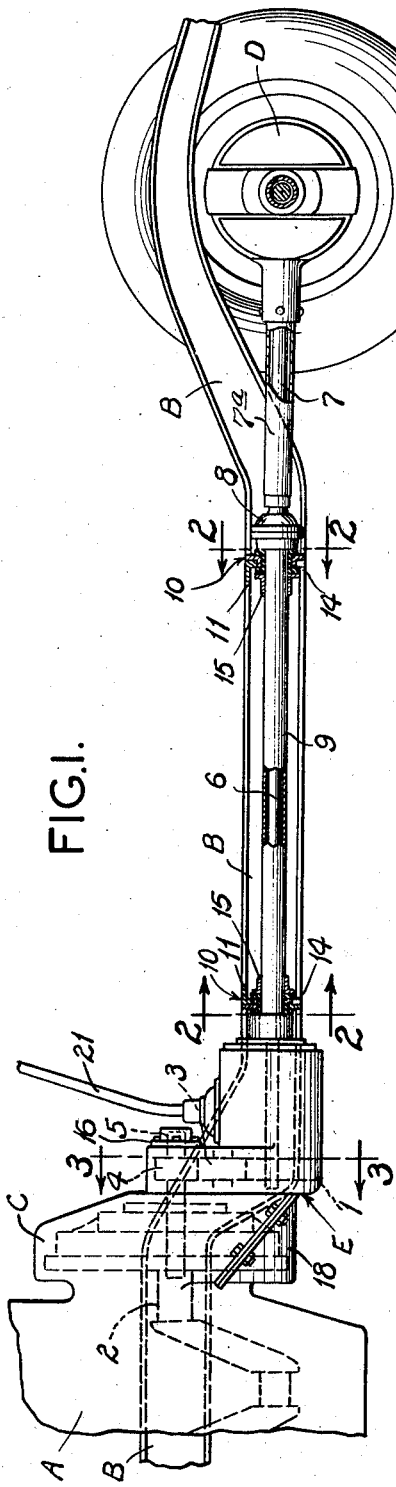
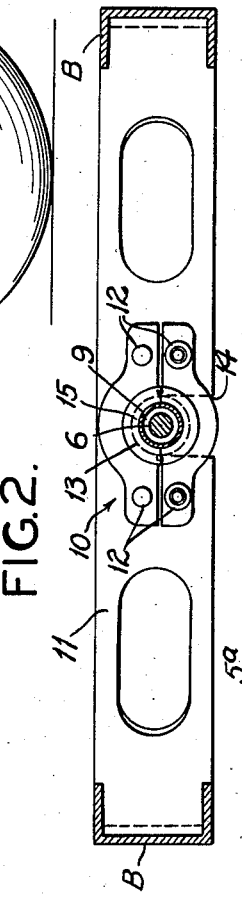
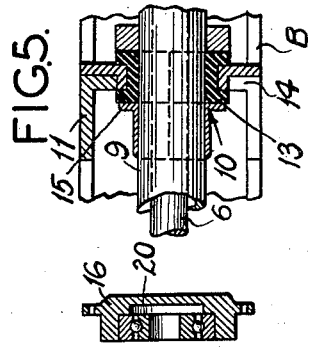
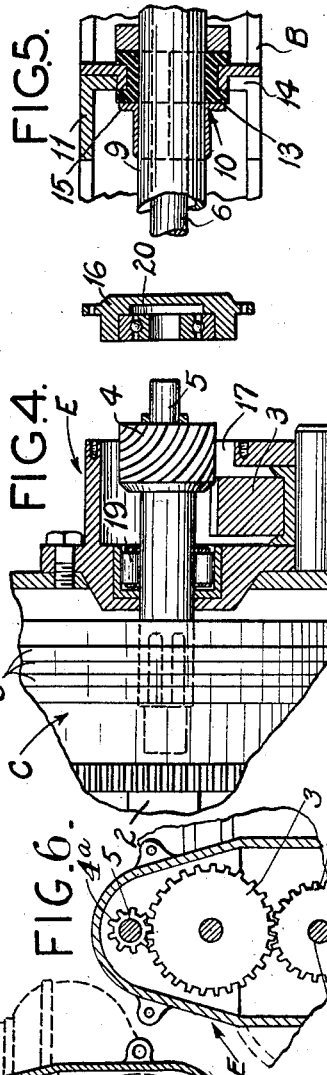
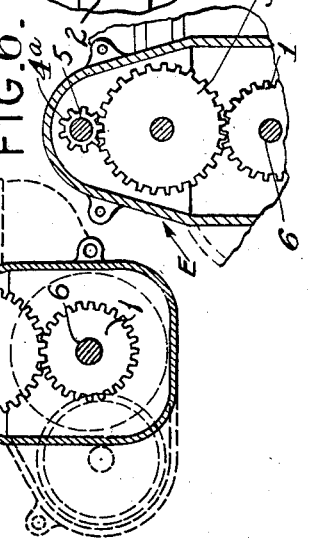
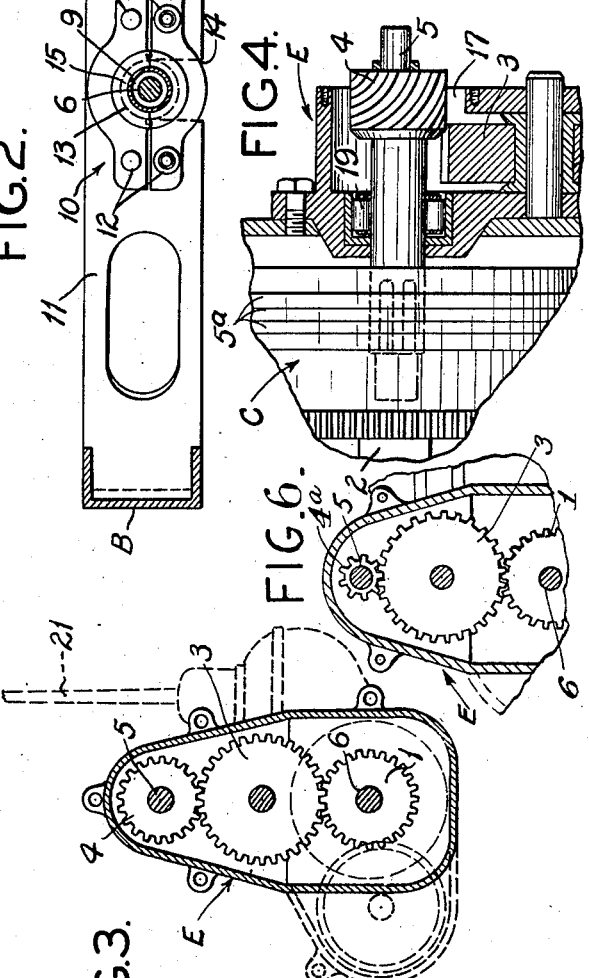
INVENTOR:
FRANK D. FRISBY.
BY
ATTORNEYS Patented June 8, 1937

2,082,826

UNITED STATES PATENT OFFICE 2,082,826

CHASSIS FOR POWER OPERATED VEHICLES

Frank D. Frisby, St. Louis, Mo.

Application May 8, 1936, Serial No. 78,565

9 Claims. (Cl. 180—73)

This invention relates to chassis for power operated vehicles, such for example, as automobile chassis.

The main object of my invention is to provide an automobile chassis whose component parts are of such design and arrangement that it is not necessary to provide the floor of the automobile body with a tunnel or raised housing for the propeller shaft in instances where the body is hung low or close to the ground thereby making it possible to produce a low-hung, stream-lined body whose floor is perfectly flat and level throughout its entire length.

Another object is to provide a chassis for automobiles and similar vehicles which is of such design that the clutch can be removed quickly and easily without the necessity of dismounting the gear box or the propeller shaft.

Another object is to provide a chassis for power operated vehicles in which the means employed to operate the drive shafts of the rear axle and produce a certain gear ratio between said drive shafts and the engine crank shaft, is of such construction and arrangement that one or more speed reducing gears may be arranged at the front end of the propeller shaft and one or more speed reducing gears may be combined with the differential mechanism of the rear axle, thereby reducing wear and noise in the transmission mechanism, improving the gear shifting operation due to the fact that the gears of the transmission mechanism rotate at a slower speed than is customary in automobiles of conventional design and also reducing the over-all dimensions of the differential housing which is advantageous in that it increases the road clearance and body clearance.

And still another object of my invention is to provide a chassis for power operated vehicles that is equipped with a torque tube of novel construction and arrangement in which a non-shiftable portion of the propeller shaft is rotatably mounted, the remainder of the propeller shaft consisting of a rockable or shiftable rear section.

To this end I have devised a chassis for power operated vehicles which differs from chassis of conventional design: (1) in that the propeller shaft is arranged out of longitudinal alignment with the engine crank shaft in a considerably lower horizontal plane than said crank shaft; (2) in that the propeller shaft comprises an oscillating or shiftable rear portion connected by a universal joint to a substantially non-shiftable front portion that is rotatably mounted in a torque tube which is held in a substantially level or horizontal position by bearings on the chassis frame that surround the torque tube and effectively transmit end thrusts on the torque tube to cross members on the chassis frame; and (3) the clutch shaft on which the friction means of the clutch is mounted is arranged in off-set relationship with the propeller shaft, in a mounting which permits said clutch shaft to be removed easily and without the necessity of dropping the gear box or removing the propeller shaft when it becomes necessary to remove the friction means of the clutch. In addition to the distinguishing characteristics above pointed out the apparatus here illustrated which constitutes my present invention, comprises numerous other novel features hereinafter described which make it an improvement upon the various types and kinds of mechanisms now used to propel automobiles, busses, trucks and power boats.

Figure 1 of the drawing is a vertical longitudinal sectional view of an automobile chassis embodying my invention.

Figure 2 is a vertical transverse sectional view taken on either of the section lines 2—2 of Figure 1 looking in the direction indicated by the arrows.

Figure 3 is a vertical transverse sectional view of the gear box taken on the line 3—3 of Figure 1 looking in the direction indicated by the arrows.

Figure 4 is an enlarged vertical longitudinal sectional view of a portion of the transmission mechanism illustrating how the clutch shaft may be removed without dropping the gear box or removing the propeller shaft.

Figure 5 is an enlarged sectional view illustrating the preferred method of mounting the torque tube, and Figure 6 is a fragmentary sectional view similar to Figure 3, illustrating a gear box designed so that the main gear will revolve at one-half the speed of the engine crank shaft.

In the accompanying drawing which illustrates one form of my invention, A designates the engine of a power operated vehicle, B designates one of the longitudinal frame members of the chassis whose intermediate portion is dropped or depressed so as to permit the body, not shown, to be hung low or close to the ground, C designates as an entirety a clutch at the rear end of the engine that is used to connect and disconnect the engine to and from the transmission mechanism, D designates as an entirety the differential mechanism that forms part of the rear axle assembly, and E designates a transmission mechanism whose housing is attached to the housing of the clutch C. The propelling mechanism of the chassis is designed in a novel manner that makes it unnecessary to form a tunnel or housing in the floor of the body to provide clearance space for the propeller shaft, and also permits the engine to be arranged in a perfectly level position if so desired. In my improved chassis the gear box, or transmission mechanism, designated as an entirety by the reference character E, is constructed in such a way that the main gear 1 is located in a considerably lower horizontal plane than the crank shaft 2 of the engine A, said main gear being connected by an idler 3 with a gear 4 on the clutch shaft 5. In addition to permitting the propeller shaft to be arranged in a considerably lower horizontal plane than the crank shaft of the engine, such a transmission mechanism permits the gears to be so designed that the main gear 1 will revolve at one-half the speed of the engine crank shaft, as shown in Figure 6, wherein the main gear 1 is illustrated as being twice the size of the gear 4a attached to the clutch shaft.

By constructing the transmission mechanism in this manner I am able to use a propeller shaft comprising a front portion 6 mounted so as to remain in a substantially horizontally disposed position under the floor of the body of the automobile, and a shiftable rear portion 7 that is capable of rocking or oscillating vertically so as to provide for the relative movement of the body and the rear axle when the vehicle is in operation, said two portions 6 and 7 being joined together by a universal joint 8 of conventional construction. The front portion 6 of the propeller shaft, which for convenience I will refer to as the non-shiftable portion, is rotatably mounted in suitable bearings, not shown, carried by a torque tube 9 that is mounted at its front and rear ends in bearings 10 carried by cross members 11 of the frame of the chassis, the front end of said torque tube 9 being rigidly connected in any suitable way to the gear box E and the rear of said torque tube being connected to the housing of the universal joint 8. The shiftable rear portion 7 of the propeller shaft is rotatably mounted in a shiftable torque tube section 7a whose front end is connected to the housing of the universal joint 8 and whose rear end is connected to the differential housing. Said torque tube bearings 10 may be of any preferred construction but in the form of my invention herein illustrated each of said bearings is comprised of two horizontally divided members (see Figure 2) attached by fastening devices 12 to one of the transverse frame members 11 and provided with torque tube engaging portions 13 of rubber or any other suitable material that virtually cause the torque tube 9 to be floatingly mounted and also tend to prevent noise produced by the propeller shaft from being transmitted to the chassis frame. As shown in Figure 2 the transverse frame members 11 are provided on their undersides with vertically disposed slots 14 so as to permit the torque tube 9 to be slipped upwardly through said slots into engagement with the top members of the bearings 10, after which the bottom members of said bearings can be applied to the frame members 11 so as to hold the torque tube in position. The end thrusts to which the torque tube 9 is subjected when the chassis is in service are transmitted to the chassis frame by flanges or equivalent devices on the torque tube that embrace or lap over the bearings 10 previously referred to. In the form of my invention herein illustrated, there are laterally projecting flanges or abutment members on the opposite ends of the torque tube which bear against the outer ends of the bearings 10 and there are collars 15 which are attached to the torque tube between the bearings 10 so to engage the inner ends of said bearing and thus in effect cause the torque tube to be surrounded by circular bearings on the chassis frame that cooperate with flanges or equivalent device on the end portions of the torque tube to receive the end thrusts to which the torque tube is subjected when the chassis is in use.

In automobile chassis of conventional design there is a universal joint located at the front of the propeller shaft practically at the point where said shaft is connected with the transmission mechanism thereby causing the entire propeller shaft to rock or swing vertically about an axis approximately coincident with the gear box when the propeller shaft or body move vertically relatively to each other due to unevenness or irregularities of the road over which the vehicle is traveling. Hence if the chassis is provided with a low-hung body it is necessary to form a tunnel housing in the floor of the body to provide for the vertical rocking or up and down movement of the propeller shaft. Such housings vary in height from a few inches to several inches and produce the effect of a longitudinally disposed hump in the floor that separates the floor space into two wells or compartments. My invention eliminates this very objectionable feature or character of conventional low-hung, stream lined automobiles, for in my improved chassis the propeller shaft comprises a relatively long, non-shiftable front portion carried by a torque tube which is arranged horizontally under the floor of the body and mounted in bearings carried by the chassis frame, and a relatively short shaft rear portion or section that is free to rock vertically to provide for the vertical movement of the body or the vertical movement of the rear axle when the vehicle is in operation, the front and rear portions of the propeller shaft being connected together by a universal joint located at the rear of the flat portion of the floor of the body. With a propeller shaft and torque tube of the construction and arrangement above described, the driving torque of the rear axle is transmitted through rubber thrust bearings 13 to the cross frame members of the chassis, instead of to the engine as is true of the conventional torque tube drive.

Another advantage that results from dropping the propeller shaft to a point considerably lower than the crank shaft of the engine and driving said propeller shaft through an idler gear, is that part of the gearing employed to produce a certain ratio of speed between the engine crank shaft and the driving shafts of the rear axle can be arranged between the engine crank shaft and the front end of the propeller shaft and the remainder of said gearing can be located in the differential housing thereby permitting the use of a differential housing that is smaller than the conventional differential housing. This is advantageous in that a reduction in the size of the differential housing increases the road clearance and body clearance and a reduction in the speed of the propeller shaft tends to reduce wear, eliminate noise and also improve the operation of shifting gears.

In automobile chassis of conventional construction the gear box and propeller shaft have to be removed whenever it is necessary to replace the friction means of the clutch because the main gear and the propeller shaft are arranged in longitudinal alignment with the clutch shaft. In my improved apparatus the clutch shaft 5 on which the friction means 5ª of the clutch is mounted is arranged in off-set relationship with the propeller shaft as shown in Figure 1. Accordingly, I can mount the clutch shaft 5 in the gear box in such a way that when a cover plate 16 on the gear box is removed as shown in Figure 4 the clutch shaft 5 and the gear 4 thereon can be removed rearwardly through the opening 17 in the gear box which said cover plate normally closes, thereby permitting the plates 5ª or other friction devices of the clutch to be removed from the clutch housing through an opening at the lower end of said housing that is normally closed by a removable bottom portion 18 of the clutch housing. As shown in Figure 4 the clutch shaft 5 is journaled in two bearings, to-wit, a front bearing 19 carried by a stationary portion of the gear box and a rear bearing 20 carried by the removable cover plate 16 previously referred to. The gear shift lever 21 is mounted on the side of the gear box as shown in Figure 3 instead of on top of the gear box as is now standard practice and, therefore, I can design the gear shift lever so as to have a short throw or any desired degree of movement, a thing that is impossible to do when the gear shift lever is mounted on top of the gear box, without providing the gear box with an elevated support for the shifting lever located at a point considerably above the top side of the floor of the body.

Having thus described my invention what I claim and desire to secure by Letters Patent is:

1. A chassis for power operated vehicles, provided with a non-shiftable torque tube, a propeller shaft provided with a portion rotatably mounted in said tube, transverse frame members and horizontally disposed bearings for said torque tube carried by said frame members, said frame members being slotted to facilitate installation and removal of said torque tube.

2. The combination of an engine clutch provided with a housing that comprises a portion which is adapted to be removed to install or remove the friction means of the clutch, a gear box combined with such clutch housing and provided with a shaft on which the friction means of the clutch is mounted and a removable portion on said gear box that is adapted to be removed to permit the clutch shaft to be withdrawn from said friction means without dismounting the gear box.

3. In a chassis for power operated vehicles, an engine clutch provided with removable friction elements, a gear box combined with the housing of said clutch and provided with a removable shaft on which the friction elements of the clutch are mounted, said gear box having a removable plate equipped with a bearing in which one end of the clutch shaft is journaled, a propeller shaft provided with a non-shiftable front portion arranged horizontally under the floor of the body mounted on the chassis and a train of gears for transmitting motion from the clutch shaft to the propeller shaft.

4. A chassis of the kind described in claim 3 in which the non-shiftable portion of the propeller shaft is mounted in a torque tube, which in effect is floatingly mounted on the frame of the chassis.

5. A chassis for power operated vehicles having a frame provided with transversely disposed portions, a torque tube, and circular bearings on said transversely disposed portions that surround the torque tube and receive the end thrusts exerted on the torque tube.

6. In a chassis for power operated vehicles, the combination of a frame provided with transversely disposed portions, a substantially horizontally disposed, non-shiftable torque tube floatingly mounted on said transversely disposed portions and a propeller shaft composed of a front portion rotatably mounted in said torque tube and a shiftable rear portion connected by a universal joint with said front portion.

7. In a chassis for power operated vehicles, the combination of a frame provided with transversely disposed portions, a torque tube, bearings on said transversely disposed portions surrounding the torque tube and faced with rubber or equivalent material, means on said torque tube that cooperates with the rubber facing of said bearings to take up end thrusts on the torque tube, and a propeller shaft comprising a front portion rotatably mounted in said torque tube and connected at its rear end by a universal joint with a shiftable rear portion that leads to the differential mechanism of the rear axle of the chassis.

8. In a chassis for power operated vehicles, the combination of an engine, a propeller shaft arranged in a considerably lower horizontal plane than the crank shaft of said engine and composed of a front portion and rear portion connected together by a universal joint, a clutch arranged at the rear of said engine, a gear box attached to the housing of said clutch and provided with a train of gears for transmitting motion from the clutch shaft to said propeller shaft, a torque tube arranged so as to support or carry the front portion of the propeller shaft, and bearings on the chassis frame that surround said torque tube and hold it in a certain approximate position relatively to the chassis frame.

9. A chassis for power operated vehicles of the kind described in claim 8 in which the shaft of the clutch is arranged so as to be capable of being withdrawn from the friction means of the clutch and removed from the clutch housing without disturbing the position of the gear box.

FRANK D. FRISBY.